(12) United States Patent
Sirco et al.

(10) Patent No.: US 10,472,840 B1
(45) Date of Patent: Nov. 12, 2019

(54) POOL SKIMMER MOUNTING ARRANGEMENTS FOR INSULATED POOL PANELS

(71) Applicant: Trojan Leisure Products, LLC, Albany, NY (US)

(72) Inventors: Collin J. Sirco, Ballston Lake, NY (US); Stephen E. Deeb, Schenectady, NY (US)

(73) Assignee: Trojan Leisure Products, LLC, Albany, NY (US)

( * ) Notice: Subject to any disclaimer, the term of this patent is extended or adjusted under 35 U.S.C. 154(b) by 0 days.

(21) Appl. No.: 15/890,849

(22) Filed: Feb. 7, 2018

(51) Int. Cl.
  *E04H 4/12* (2006.01)
  *C02F 103/42* (2006.01)
(52) U.S. Cl.
  CPC ........ *E04H 4/1272* (2013.01); *C02F 2103/42* (2013.01)
(58) Field of Classification Search
  CPC .......................... E04H 4/1272; C02F 2103/42
  USPC ...................................................... 210/167.1
  See application file for complete search history.

(56) References Cited

U.S. PATENT DOCUMENTS

| | | | |
|---|---|---|---|
| 4,126,925 A | 11/1978 | Jacuzzi | |
| 4,426,286 A | 1/1984 | Puckett et al. | |
| 4,649,579 A | 3/1987 | Blais | |
| 4,776,908 A * | 10/1988 | Sapp | E04H 4/1272 156/330 |
| 5,195,191 A | 3/1993 | Stefan et al. | |
| 6,458,270 B1 | 10/2002 | Watson et al. | |
| 7,309,443 B2 | 12/2007 | Kelly | |
| 7,914,099 B2 | 3/2011 | Gerspach | |
| 9,890,547 B1 * | 2/2018 | Sirco | E04H 4/1272 |
| 10,138,645 B1 * | 11/2018 | Sirco | E04H 4/1272 |
| 2008/0216877 A1 | 9/2008 | Lawson | |

(Continued)

FOREIGN PATENT DOCUMENTS

EP    2014849 A1    1/2009

OTHER PUBLICATIONS

Model SP1084 Series Auto-Skim™ Automatic Surface Skimmer Onmer's Manuaul, Hayward Pool Products of Elizabeth, New Jersey, 8 pages, 2011.

(Continued)

*Primary Examiner* — Fred Prince
(74) *Attorney, Agent, or Firm* — Tech Valley Patent, LLC; John Pietrangelo

(57) ABSTRACT

Mounting arrangements for pool skimmers, methods for mounting pool skimmers, and pool skimmer installation kits are disclosed which overcome the limitations of the prior art. Aspects of the invention include a pool skimmer mounting arrangement for mounting a skimmer assembly on an insulated wall of a pool. The pool wall may have an internal side panel, an external side panel, and internal insulation. The mounting arrangements include a penetration in the internal side panel of the pool wall; an adapter plate having an internal cavity and perforations mounted over the penetration in internal side panel; a penetration in the external side panel adapted to receive the inlet of the skimmer assembly; and fasteners adapted to engage the perforations in the adapter plate and the skimmer assembly to mount the skimmer assembly to the insulated pool wall. Methods of practicing the invention and installation kits are also provided.

20 Claims, 3 Drawing Sheets

(56) References Cited

U.S. PATENT DOCUMENTS

2011/0296601 A1 12/2011 Hodak
2017/0298683 A1* 10/2017 Hodak .................... E06B 7/231

OTHER PUBLICATIONS

Model SP10E34B skimmer gasket provided by Hayward Pool Products of Elizabeth, New Jersey, 1 page, undated.
Model SP1091 Series Dyna-SkimTM Automatic Skimmer Owner's Manual, Hayward Pool Products of Elizabeth, New Jersey, 4 pages, undated.
Model SPX1091G butterfly-type gasket provided by Hayward Pool Products [0065] of Elizabeth, New Jersey, 1 page, undated.
Pentair Bermuda Vinyl Skimmer Installation and User's Guide, 14 pages, 2014.
Swimline Model 8940 Skimmer Installation Instructions, 3 pages, 2009.

\* cited by examiner

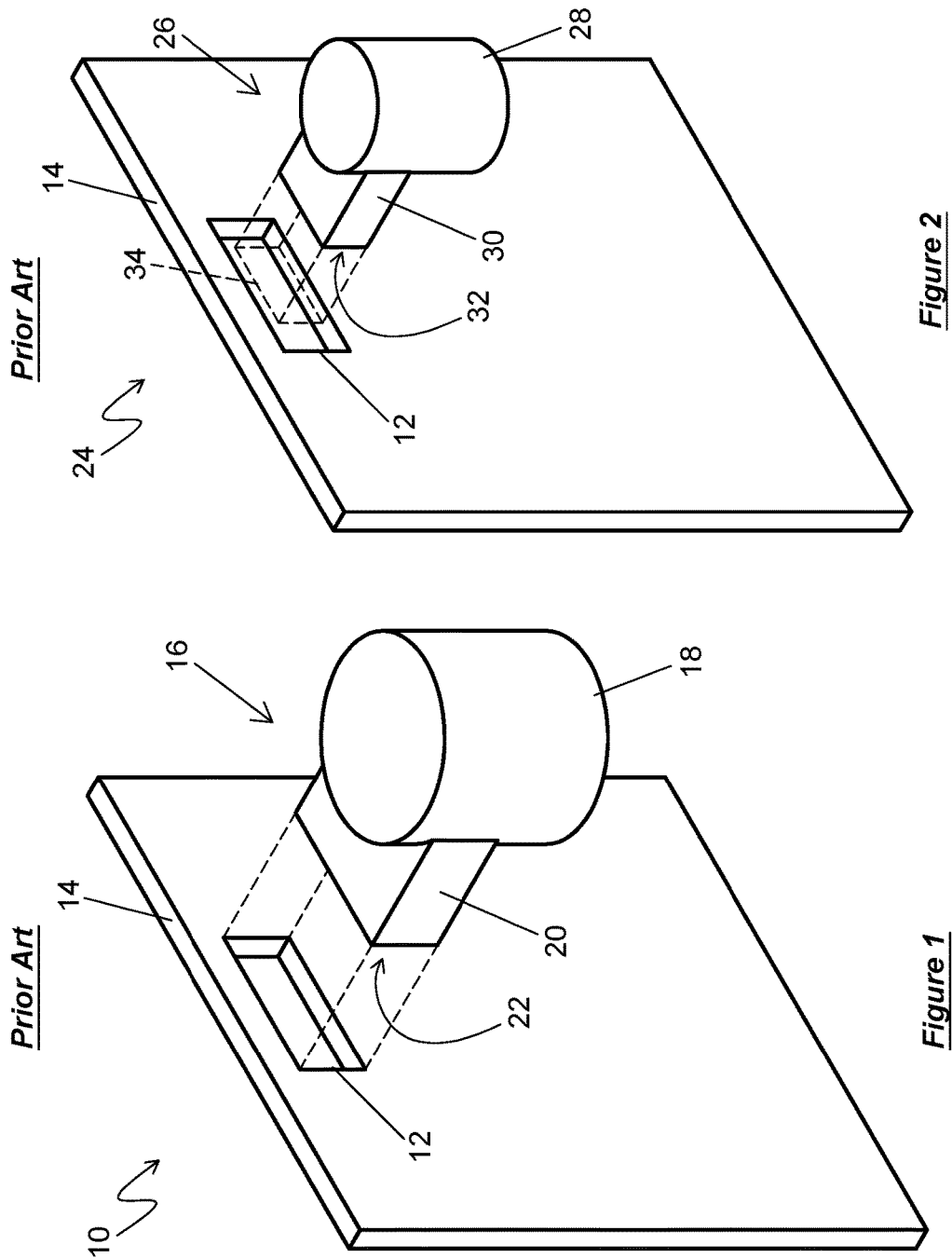

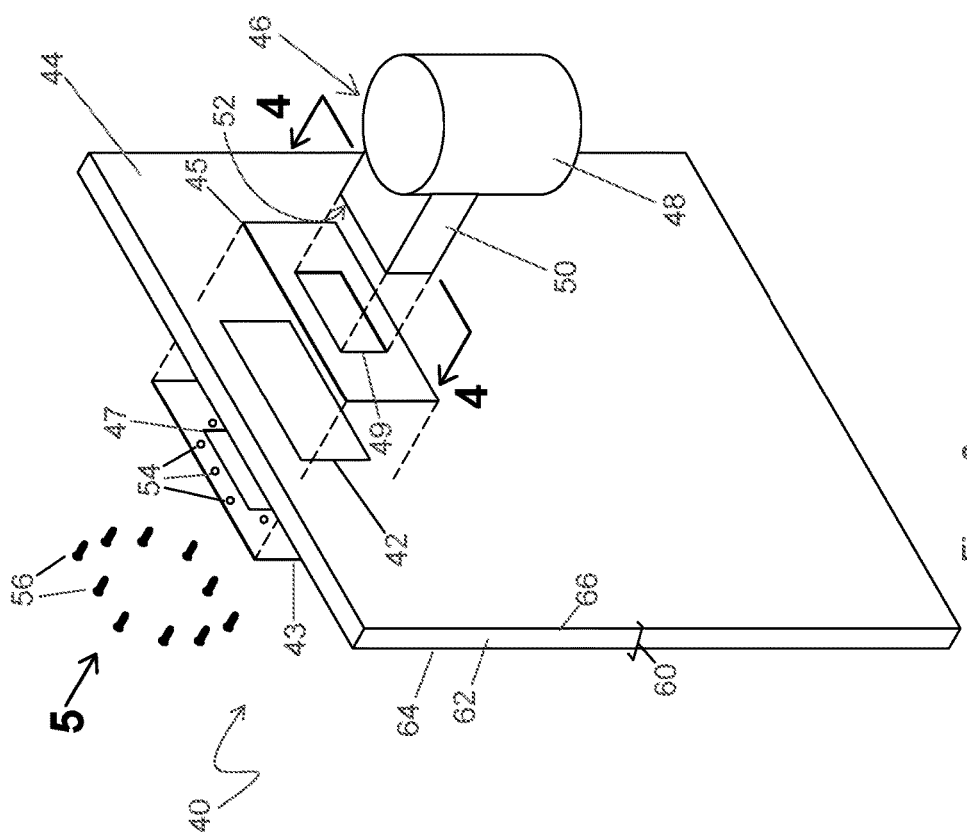
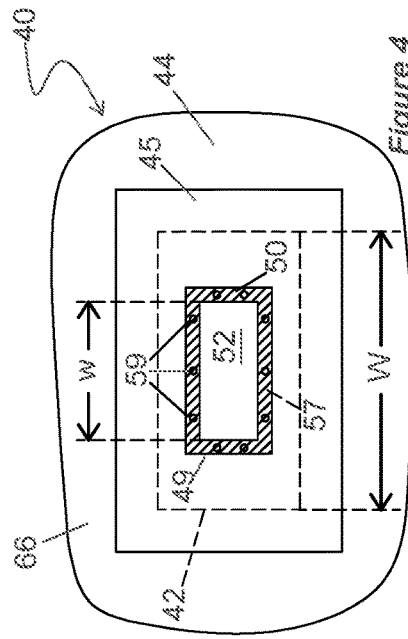
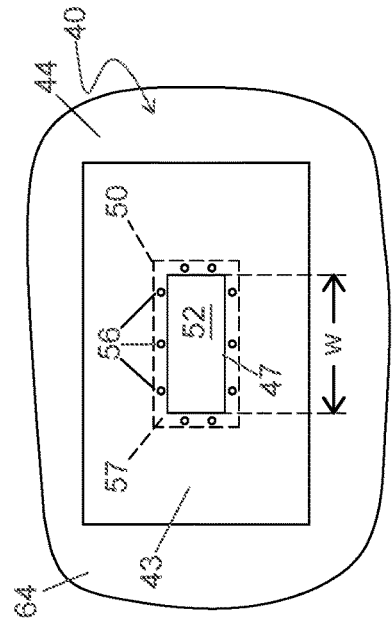

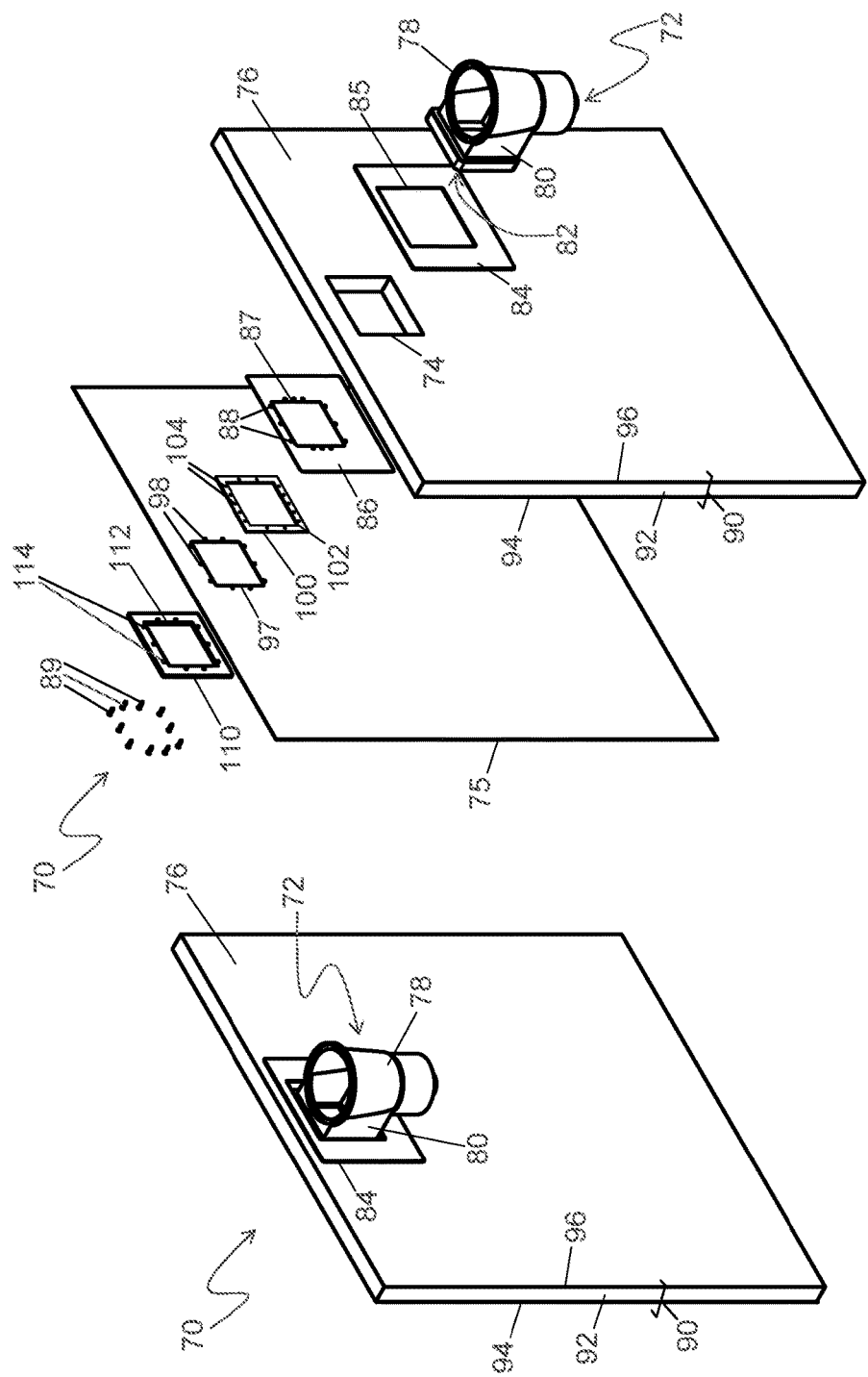

POOL SKIMMER MOUNTING ARRANGEMENTS FOR INSULATED POOL PANELS

BACKGROUND OF THE INVENTION

Technical Field

The present invention generally relates to swimming pool skimmer installations, and, in particular, to swimming pool skimmer mounting arrangements, methods for installing swimming pool skimmers, and swimming pool skimmer installation kits.

Description of Related Art

Swimming pool skimmers are a common feature of substantially every public or private swimming pool. Swimmers are likely familiar with the recesses in the side of a swimming pool that provide access to the skimmer proper, which includes a collection basket for debris and a return conduit to the pool's filtration system. As is known in the art, the conventional pool skimmer provides a convenient and effective means for regulating the presence of debris in the pool and, hence, enhancing sanitation and bather safety.

As is known in the art, various suppliers provide skimmer assemblies having an varyingly sized pool water inlets, filter baskets, and assorted conduits adapted to be plumbed to the filtration system. The size and shape of these typical aftermarket skimmer assemblies can vary broadly depending upon, among other things, the manufacturer, the flow capacity, and the details of the installation. For the typical aboveground, backyard pool with a conventional vinyl liner, the installation of the skimmer assembly typically requires that the installer provide a hole in the liner to accommodate the size and dimensions of the skimmer assembly being installed.

However, the fabrication and installation of "panel type" pools do not lend themselves to simple on-site cutting of the pool panel or wall in order to accommodate the size and shape of the skimmer assembly being installed. Panel type pool construction, for example, the insulated-panel type pool construction that characterizes the leading suppliers in the field, for example, Radiant Pools of Albany, N.Y., provide pre-cut perforations or through holes for skimmer installation in prefabricated panel units. Since the required size and shape of these pre-cut through holes may vary depending upon the skimmer assembly being used, the present invention was developed to facilitate pool skimmer installation and to provide flexibility in the selection of skimmer assemblies when designing and installing skimmer assemblies for pools.

As disclosed in U.S. patent application Ser. No. 14/642,425, now U.S. Pat. No. 9,890,547, skimmer assemblies and methods of installing skimmer assemblies are provided that meet many of the demands of the pool installer and of the pool owner.

Aspects of the present invention also overcome the disadvantages of the prior art skimmer installations by providing swimming pool skimmer mounting arrangements, methods for installing swimming pool skimmers, and swimming pool skimmer installation kits that are easier to adapt to varying skimmer sizes and shapes.

SUMMARY OF THE INVENTION

After experiencing the inconveniences that characterize prior art skimmer installations and their methods of installation, the present inventors provide the following improvements.

According to one embodiment of the invention, a pool skimmer mounting arrangement for mounting a skimmer assembly on an insulated wall of a pool is provided. The insulated pool wall typically includes an internal side panel, an external side panel, and internal insulation. The mounting arrangement may comprise or consist of: a penetration in the internal side panel adapted to conform to an inlet of the skimmer assembly; a penetration in the external side panel and a penetration in the internal insulation, the penetration in the external side panel and the penetration in the internal insulation each adapted to receive the inlet of the skimmer assembly and each having a width greater than a width of the penetration in the internal panel; an adapter plate having an internal cavity and a plurality of perforations about the internal cavity; and a plurality of fasteners adapted to engage the plurality of perforations in the adapter plate and engage a plurality of holes the skimmer assembly to mount the skimmer assembly to the insulated pool wall.

In one aspect, the pool skimmer mounting arrangement may further include an external adapter plate adapted to mount over the penetration in the external side panel.

Another embodiment of the invention is a method of installing a pool skimmer assembly on an insulated wall of a pool, the insulated wall having an internal side panel, an external side panel, and internal insulation, the method comprising or consisting of: providing a penetration in the internal side panel adapted to conform to an inlet of the skimmer assembly; mounting an adapter plate having an internal cavity and a plurality of perforations about the internal cavity over the penetration in the internal side panel; providing a penetration in the external side panel and a penetration in the internal insulation, the penetration in the external side panel and the penetration in the internal insulation each adapted to receive the inlet of the skimmer assembly and each having a width greater than a width of the internal cavity of the adapter plate; inserting the inlet of the skimmer assembly into the penetration in the external side panel and into the penetration in the internal insulation; and engaging a plurality of fasteners in the plurality of perforations in the adapter plate and in a plurality of holes in the skimmer assembly to mount the skimmer assembly to the insulated pool wall.

A further aspect of the invention is a pool skimmer installation kit for mounting a skimmer assembly on an insulated wall of a pool, the insulated wall having an internal side panel, an external side panel, and internal insulation, the installation kit comprising or consisting of: a panel adapted to mount over a penetration through the insulated wall of the pool, the panel having an internal cavity adapted to conform to an inlet of the skimmer assembly and a plurality of perforations about the internal cavity adapted to receive fasteners adapted to engage a plurality of holes in the skimmer assembly; and a plurality of fasteners adapted to engage the plurality of perforations in the panel and the plurality of holes in the skimmer assembly to mount the skimmer assembly to the insulated pool wall. In one aspect, the kit may further include installation instructions for using the kit.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 1 is schematic perspective view of one skimmer assembly mounting to a perforation in a pool wall according to the prior art.

FIG. 2 is a schematic perspective view of another skimmer assembly mounting to the perforation in the pool panel shown in FIG. 1 according to the prior art.

FIG. 3 is a schematic, exploded perspective view of a skimmer assembly mounting arrangement according to one aspect of the invention.

FIG. 4 is a detailed view, partially in cross section, of the skimmer assembly mounting arrangement shown in FIG. 3 as viewed along section lines 4-4 in FIG. 3.

FIG. 5 is a detailed view of the skimmer assembly mounting arrangement shown in FIG. 3 as viewed along view line 5 in FIG. 3.

FIG. 6 is a perspective view of a mounting arrangement of one skimmer assembly to a perforation in a pool panel according to an aspect of the present invention.

FIG. 7 is an exploded perspective view of the mounting arrangement shown in FIG. 6.

DETAILED DESCRIPTION OF THE INVENTION

FIG. 1 is schematic perspective view of one skimmer assembly mounting 10 to a penetration or through hole 12 in a pool wall 14 according to the prior art. It is to be understood that pool wall 14 shown in FIG. 1 (and other "pool walls" shown in and described with respect to other figures herein) is representative of only a portion of a pool wall assembly adapted to retain pool water, for example, a pool wall assembly having a typical "vinyl pool liner" as known in the art. FIG. 1 illustrates a typical conventional pool skimmer assembly 16 having a body portion 18 sized to hold a skimmer basket (not shown) and an inlet passage 20 having an inlet opening 22 adapted to receive pool water. As shown in FIG. 1, as is typical of prior art skimmer assembly mountings, inlet opening 22 of skimmer assembly 16 is typically aligned with hole 12 and mounted to pool wall 14 with appropriate fasteners (not shown) whereby the inlet opening 22 in inlet passage 20 substantially aligns with the extents of hole 12. The substantial alignment of inlet passage 20 with the extents of hole 12 is represented by dashed lines in FIG. 1.

FIG. 2 is a schematic perspective view of another skimmer assembly mounting 24 to the perforation 12 in a pool panel 14 shown in FIG. 1 according to the prior art. FIG. 2 illustrates another typical conventional pool skimmer assembly 26 having a body portion 28 sized to hold a skimmer basket (not shown) and an inlet passage 30 having an inlet opening 32 adapted to receive pool water. However, in contrast to the mounting arrangement 10 shown in FIG. 1, in the mounting arrangement 24 shown in FIG. 2, the inlet opening 32 of skimmer assembly 26 does not typically align with the extents of perforation 12. The substantial non-alignment of inlet passage 32 with the extents of perforation 12 is represented by dashed lines in FIG. 2. As shown, in this example employing one prior art skimmer assembly 26, the size of the inlet opening 32 of inlet passage 30 may be smaller, for example, much smaller, than the size of perforation 12. This size difference is illustrated by the projection 34 of inlet opening 32 upon perforation 12.

It is to be understood that pool wall 14 and skimmer assemblies 16 and 26 shown in FIGS. 1 and 2 (and other "pool walls" and "skimmer assemblies" shown in and described with respect to other figures herein) are representative only, and, for the sake of facilitating disclosure, omit typical piping, valves, pumps, bracing, supports, and other ancillary equipment and structures associated with pool and skimmer assembly construction.

As shown in FIG. 2, without proper modification of either hole 12 in wall 14 or of inlet passage 30 in skimmer assembly 26, skimmer assembly 26 is incompatible with hole 12. However, in the art of swimming pool fabrication, the shape and dimensions of skimmer assemblies, such as, skimmer assembly 16 shown in FIG. 1 or skimmer assembly 26 shown in FIG. 2, though varied, may be limited. Specifically, providers of skimmer assemblies may provide a limited variation in the shape and dimensions of skimmer inlets 20 and 30 and inlet passages 22, 32, and the pool installer typically must adapt the installation accordingly.

In addition, in the design of certain pool walls, or pool panels, the size of wall hole 12 is typically also limited, for example, by design or by the constraints of fabrication and shipping. For example, for panel-type pools, for example, those swimming pool panels designed and fabricated by Radiant Pools of Albany, N.Y., the unique insulated panel construction have internal insulation and external side walls or side panels does not lend itself easily to modification of hole 12. Such insulated pool panels are disclosed in U.S. Published Patent Application 2008/0104745 of Beaudoin, et al. and in U.S. Published Patent Application 2014/0208687 of Foster, et al., both of which are included by reference herein. For example, in some cases, multiple pool panels 14 may be provided having varying sizes for hole 12. Accordingly, the prior art skimmer mountings represented by the mountings shown in FIGS. 1 and 2 illustrate that there is a need in the art for improved, more versatile skimmer mounting arrangements that overcome the disadvantages illustrated by the examples shown in FIGS. 1 and 2. Aspects of the present invention provide such solutions.

FIG. 3 is a schematic, exploded perspective view of a skimmer assembly mounting arrangement 40 according to one aspect of the invention. As shown in FIG. 3, arrangement 40 includes a skimmer assembly 46, for example, a skimmer assembly similar to skimmer assembly 26 shown in FIG. 2, having a body portion 48 sized to hold a skimmer basket (not shown) and an inlet or inlet passage 50 having an inlet opening 52 adapted to receive pool water. As also shown in FIG. 3, skimmer assembly 46 is adapted to be mounted to pool wall or panel 44 having penetration or through hole 42, for example, similar to hole 12 shown in FIGS. 1 and 2.

FIG. 4 is a detailed view, partially in cross section, of the skimmer mounting 40 shown in FIG. 3 as viewed along section lines 4-4 in FIG. 3. FIG. 5 is a detailed view of the skimmer mounting 40 shown in FIG. 3 as viewed along view line 5 in FIG. 3.

According to aspects of the present invention, as shown in FIGS. 3, 4, and 5, mounting arrangement 40 may include an internal adapter plate 43 (for example, "internal" to pool wall 44) and an external adapter plate 45 for mounting skimmer assembly 46. In one aspect, internal adapter plate 43 may comprise a separate panel, for example, a panel separate from wall 44. Adapter plates 43 and 45 may each typically comprise an internal cavity or through hole 47 and 49, respectively. Through holes 47 and 49 may each be adapted to at least partially align with inlet opening 52 of pool skimmer assembly 46; however, typically, through holes 47 and 49 substantially completely align with inlet opening 52 of pool skimmer assembly 46. According to aspects of the invention, internal adapter plate 43 may mount to panel 44, for example, via mechanical fasteners and/or and an adhesive, such as, an epoxy, and skimmer assembly 46 may mount to internal adapter plate 43, for example, by mechanical fasteners and/or an adhesive, to mount skimmer assembly 46 to pool wall 44. According to other aspects of the invention, external adapter plate 45 may also mount to panel 44, for example, via mechanical fasteners and/or and an adhesive, such as, an epoxy. In other aspects of the invention external adapter plate 45, which may have no load bearing or mounting function, may be omitted, whereby skimmer assembly 46 may be mounted substantially exclusively to internal mounting plate 43 and appropriate fasteners.

In the aspect of the invention shown in FIGS. 3, 4, and 5, internal adapter plate 43 having internal cavity 47 may be mounted to panel 44 with an adhesive, such as, a Locktite® brand epoxy, or its equivalent. As shown in FIG. 3, internal adapter plate 43 may typically include a plurality of perforations, through holes, or screw holes 54 adapted to receive a plurality of mechanical fasteners 56 to mount skimmer assembly 46 to panel or wall 44. For example, fasteners 56 may be threaded fasteners, for instance, self-tapping screws, for example, Hayward SPX1085Z1A self-tapping screws, or their equivalent. In one aspect, the plurality of fasteners 56 may be adapted to engage the plurality of perforations 54 in the internal adapter plate 43 and engage the plurality of holes in the inlet 50 of the skimmer assembly 46 to mount the skimmer assembly 46 to the pool wall or panel 44. Mechanical fasteners 56 may typically engage inlet 50 of skimmer assembly 46 to mount skimmer assembly 46 to panel or wall 44. In one aspect, inlet 50 of skimmer assembly 46 may have a face or flange 57 having a plurality of holes 59 (see FIG. 4) adapted to receive mechanical fasteners 56 to secure skimmer assembly 46 to panel or wall 44.

In one aspect, pool panel or wall 44 may comprise a unique insulated panel construction having internal insulation and external side walls or side panels, for example, as disclosed in U.S. Published Patent Application 2008/0104745 or in U.S. Published Patent Application 2014/0208687, both of which are included by reference herein. For example, as shown in FIG. 3, in one aspect, pool panel 44 may comprise an insulated pool panel 60 having internal insulation 62, an internal side panel or wall 64, and an external side panel or wall 66. In one aspect, the hole 42 in pool wall or panel 44 may comprise a penetration in the internal side panel 64 adapted to conform to an inlet of the skimmer assembly, a penetration in the external side panel 66 and a penetration in internal insulation 62, each adapted to receive inlet 50 of skimmer assembly 46.

In one aspect, as shown in FIG. 4, the extent W (that is, the height and/or the width) of the penetration 42 in the external side panel 66 and the extent W (that is, the height and/or the width) of the penetration 42 in internal insulation 62 may be greater than, for example, wider than, the extent (that is, the height and/or the width) w of internal cavity 47 of internal adapter plate 43. For example, the extent W may be at least 25% greater than extent w, for instance, 25% to 100% greater than extent w. In one aspect, the extent W of the penetration 42 in the external side panel 66 and the extent W of the penetration 42 in internal insulation 62 may be substantially the same. In other aspects, the extent W of the penetration 42 in the external side panel 66 and the extent W of the penetration 42 in internal insulation 62 may vary. Accordingly, in one aspect, when inlet 50 of skimmer assembly 46 is inserted into penetration 42, the face or the flange 57 of inlet 50 may typically contact or abut a portion of adapter plate 43, and thus allow mounting of inlet 50 to adapter plate 43, for example, with fasteners 56.

As shown in FIGS. 4 and 5, in one aspect, internal cavity 49 in adapter plate 45 (and internal cavity 47 in plate 43) may be a closed cavity, that is, having an uninterrupted internal surface; in another aspect, internal cavity 47 and/or 49 may be an open cavity. Though not shown in FIGS. 3 and 4, adapter plates 43 and 45 may typically include a plurality of through holes adapted to receive mechanical fasteners to secure plates 43 and/or 45 to wall or panel 44 and/or to skimmer assembly 46.

According to aspects of the invention, by providing one or more adapter plates 43 and/or 45 that are sized to fit over hole 42 in pool wall or panel 44, pool wall or panel 44 may be provided with one or more holes 42 of a predetermined size and dimension and, with the use of an appropriately sized adapter plates 43 and/or 45, hole 42 may accommodate the use of two or more skimmer assemblies 46 having varyingly sized inlet passages 50. For example, in one aspect, hole 42 in wall or panel 44 may be sized to accommodate a first skimmer assembly 46 having a first inlet passage 50 of a first size and/or shape (for example, substantially identical to the size and shape of hole 42). Then, in order to accommodate one or more second skimmer assemblies 46 having a second inlet passage 50 having a second size and/or shape, different from the first size and/or shape, one or more adapter plates or sets of adapter plates 43 and/or 45 may be provided. The one or more adapter plates or sets of plates 43 and/or 45 may have dimensions that at least partially cover hole 42 (but, preferably, dimensions that at least completely conceal hole 42) and have an internal cavity or through hole 47 and/or 49 sized and shaped to accommodate the size and/or shape of inlet passage 50 of the one or more second skimmer assemblies 46. Accordingly, in employing aspects of the invention, only one or a limited number of walls or panels 44 having one or more holes 42 of a predetermined size and/or shape may be provided while allowing the installation and use of two or more skimmer assemblies 46 having inlet passages 50 of varying size and/or shape. Specific examples of application of the invention are shown in FIGS. 6 and 7.

In FIGS. 3, 4, and 5, adapter plates 43 and 45 are shown having a substantially rectangular shape, for example, reflective of the substantially rectangular shape of the inlet passage 50 of the skimmer 46. However, according to aspects of the invention, adapter plates 43 and/or 45 may assume a broad range of sizes shapes, and, depending upon the shape of the inlet passage 50, adapter plates 43 and 45 may have a broad range of shapes for internal cavities or through holes 47 and 49, respectively. For example, in one aspect, adapter plates 43 and 45 may be generally circular in shape, oval in shape, square in shape, or generally polygonal in shape, for example, hexagonal or octagonal in shape. In addition, through holes 47 and 49 may also be generally circular in shape, oval in shape, square in shape, or generally polygonal in shape, for example, hexagonal or octagonal in shape, for example, depending upon the size and shape of the inlet passage 50 of skimmer assembly 46.

In one aspect, the present invention may be uniquely adapted to pool panels or walls 44 having a thickness, for instance, a pool panel or wall 44 that is thicker than a conventional pool wall. For example, panel or wall 60 may include internal insulation 62, such as, panels provided by Radiant Pools. In one aspect, pool panel or wall 60 may comprise a thickness of at least about 0.125 inches, for example, at least about 1 inch. In one aspect, pool panel or wall 60 may have a thickness ranging from about 0.125 inches to about 6 inches, but is typically about 1 inch to about 3 inches in thickness, such as, about 2 inches in thickness.

In addition, though aspects of the invention may be uniquely adapted to panel-type pool walls, such as, wall or panel 44 in FIGS. 3, 4, and 5, aspects of the invention may also be applied to pool walls comprising molded shapes, such as, shaped or poured concrete or other media, and to pools having liners, for example, vinyl liners.

FIG. 6 is a perspective view of a mounting arrangement 70 for mounting one skimmer assembly 72 to a penetration or through hole 74 (not shown in FIG. 6) in a pool wall or panel 76 according to an aspect of the present invention. FIG. 7 is an exploded perspective view of the mounting arrangement 70 shown in FIG. 6. The penetration or through hole 74 in pool wall or panel 76 is clearly identified in FIG. 7.

As known in the art, skimmer assembly 72 shown in FIGS. 6 and 7 is typical of a skimmer assembly used for "above ground" or "partially above ground" pool installations. For example, skimmer assembly 72 may be a Model SP1091 Series Dyna-Skim™ Automatic Skimmer by Hayward Pool Products, or its equivalent. As is known in the art, "above ground" or "partially above ground" installations are those where walls or panels 76 are installed where the outer surface of walls or panels 76 are not located beneath the surface of an adjacent deck, patio, or lawn and the like (for example, there is no backfill about the outside surface of the wall or panel 76), and, among other things, the panel or wall 76 may not rely on the support of any adjacent material. In one aspect, in an above ground installation, mounting arrangement 70 and skimmer assembly 72 may be exposed for access and maintenance as needed. Skimmer assembly 72 may require a support pole or rod (not shown), though in some aspects, for example, as shown for skimmer assembly 72 shown in FIGS. 6 and 7, a support rod may not be used.

In other aspects of the invention, skimmer assembly 72 shown in FIGS. 6 and 7 may be adapted or used for "in-ground" pool installations. As is known in the art, "in-ground" installations are those where walls or panels 76 are installed beneath the surface of an adjacent deck, patio, or lawn and the like (for example, with the addition of backfill about the outside surface of the wall or panel 76), and only the top of skimmer assembly 72 is typically exposed to view and access.

As shown in FIGS. 6 and 7, mounting arrangement 70 may include a skimmer assembly 72 having a body portion 78 sized to hold a skimmer basket (not shown) and an inlet or inlet passage 80 having an inlet opening 82 located and adapted to receive pool water. As also shown in FIG. 7, skimmer assembly 72 may be adapted to be mounted to pool wall or panel 76 having a penetration or through hole 74, for example, similar to hole 12 shown in FIGS. 1 and 2 or to hole 42 shown in FIGS. 3, 4, and 5. Though pool wall or panel 76 is shown generally planar in FIGS. 6 and 7, pool wall or panel 76 may also be curved, for example, concavely or convexly curved. According to aspects of the invention, hole 74 may be "pre-cut" in wall or panel 76; for example, in one aspect, hole 74 may be provided in wall or panel 76 as a panel or wall 76 is received from a supplier, for example, as received from Radiant Pools of Albany, N.Y. In other aspects, hole 74 may be cut "on site" near or at the location of the pool installation, for example, "in the field." In addition, as shown in FIGS. 6 and 7, pool wall or panel 76 may be used with a pool liner 75, for example, a "vinyl pool liner" as known in the art, only representative portion of which is shown in FIG. 7.

According to one aspect of the invention, mounting arrangement 70 includes one or more adapter plates, for example, one or more external or outside adapter plates 84 and/or one or more internal or inside adapter plates 86 adapted to mount skimmer assembly 72 to panel or wall 76. As shown in FIG. 7, external adapter plate 84 may include an internal cavity 85 and internal adapter plate 86 may include an internal cavity 87. External adapter plate 84, internal cavity 85, internal adapter plate 86, and internal cavity 87 may each be sized and shaped to accommodate the size and shape of skimmer assembly 72. For example, as shown in FIG. 7, external adapter plate 84 may be generally rectangular, but may also be circular, oval, square, or generally polygonal in shape. Though not shown in FIG. 7, in order to facilitate installation, internal cavity 85 of external adapter plate 84 may be an open cavity, for example, whereby external adapter plate 84 may be "u-shaped." The open internal cavity 85 may be adapted to engage, for example, slidingly engage, the outside surface of inlet passage 80, for instance, slidingly engage one or more corresponding slots, ribs, or passages on or in inlet passage 80 of skimmer assembly 72.

As also shown in FIG. 7, internal adapter plate 86 may be substantially rectangular in shape to accommodate the shape of inlet passage 80, but may also be circular, oval, square, or generally polygonal in shape. Internal cavities 85 and 87 may also be substantially rectangular in shape to accommodate the shape of inlet passage 80, but may also be circular, oval, square, or generally polygonal in shape. Internal cavity 87 may be an opened or closed cavity.

External adapter plate 84 and internal adapter plate 86 may be adapted to be mounted to panel or wall 76 by conventional means, for example, via an adhesive and/or a plurality of mechanical fasteners.

According to aspects of the invention, in the aspect of the invention shown in FIGS. 6 and 7, internal adapter plate 86 having internal cavity 87 may be mounted to panel 76 with an adhesive, such as, a Loctite® brand epoxy, or its equivalent. As shown in FIG. 7, internal adapter plate 86 may typically include a plurality of perforations, through holes, or screw holes 88 adapted to receive a plurality of mechanical fasteners 89 to mount skimmer assembly 72 to panel or wall 76. For example, fasteners 89 may be threaded fasteners, for instance, self-tapping screws, for example, Hayward self-tapping screws, or their equivalent. Mechanical fasteners 89 may typically engage holes 88 in plate 86 and engage inlet 80 of skimmer assembly 72 to mount skimmer assembly 72 to panel or wall 76. In one aspect, inlet 80 of skimmer assembly 72 may have a face or flange having a plurality of holes (see FIG. 4) adapted to receive mechanical fasteners 89 to secure skimmer assembly 72 to panel or wall 76.

In one aspect, pool panel or wall 76 may comprise a unique insulated panel construction having internal insulation and external side walls or side panels, for example, as disclosed in U.S. Published Patent Application 2008/0104745 or in U.S. Published Patent Application 2014/0208687, both of which are included by reference herein. For example, as shown in FIGS. 6 and 7, in one aspect, pool panel 76 may comprise an insulated pool panel 90 having internal insulation 92, an internal side panel or side wall 94, and an external side panel or side wall 96. In one aspect, the internal adapter plate 86 may be mounted to internal side panel 94 with mechanical fasteners and/or an adhesive, such as, a Loctite brand epoxy.

As shown in FIG. 7, in another aspect of the invention, mounting arrangement 70 may also include one or more sealing elements 100 (for example, an elastomeric gasket) having an internal cavity 102 and through holes or screw holes 104.

In another aspect of the invention, mounting arrangement 70 may also be adapted to engage liner 75. For example, as shown in FIG. 7, liner 75 may have a through hole or perforation 97 adapted to at least partially align with inlet 80, for example, substantially completely align with inlet 80. In addition, one or more fascia or reinforcing plates 110 having internal cavity 112 and through holes or screw holes 114 may be provided to finish the appearance of the mounting and/or secure the mounting of liner 75 to skimmer assembly 72.

As shown in FIG. 7, in one aspect, internal cavities 85, 87, 102, and 112 of plate 84, plate 86, sealing element 100, and plate 110, respectively, may be closed cavities, that is, having an uninterrupted internal surface, or open cavities.

In one aspect, as discussed herein, external plate 84 may be omitted.

External adapter plate 84, internal adapter plate 86, sealing element 100, and plate 110 may be fabricated from any conventional material, including a metal, a plastic, a rubber, and even wood. In one aspect of the invention, external adapter plate 84, internal adapter plate 86, and plate 110 may preferably be fabricated from a plastic, for example, a polyamide (PA), for instance, nylon; a polyethylene (PE), both high-density polyethylene (HDPE) and low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); among other plastics. External adapter plate 84, internal adapter plate 86, and plate 110 may also be fabricated from a metal, for example, aluminum, steel, or stainless steel, among other structural metals.

Sealing element 100 may typically be fabricated from any conventional flexible material, for example, a natural polymer, such as, polyisoprene rubber, or a synthetic polymer, such as, a neoprene, a thermoplastic elastomer, a thermoplastic rubber, and a polyvinyl chloride, or an ethylene propylene diene monomer (EPDM) rubber, and the like.

External adapter plate 84, internal adapter plate 86, sealing element 100, and plate no may each have a thickness ranging from about 0.125 inches to about 2 inches, but typically have a thickness between about 0.25 inches and about 1 inch, for example, about 0.375 inches in thickness.

According to one aspect of the invention, it is envisioned that the mounting arrangement 70 shown in FIGS. 6 and 7 may be installed by the following procedures. First, positioning an internal adapter plate 86 having through hole 87 and holes 88 to the internal surface of panel 94, for example, with mechanical fasteners and/or an adhesive. Then, inserting inlet passage 80 of skimmer assembly 72 into panel hole 74 so that the face of the inlet passage 80 engages internal adapter plate 86. Then, securing the skimmer assembly 72 to internal adapter plate 86 with mechanical fasteners 89 to retain the skimmer assembly 72 in hole 74. In one aspect, the sealing element 100 having holes 104 may also be mounted on internal adapter plate 86, for example, with the same screws 89, if needed. In addition, in one aspect, liner 75 may be engaged to mounting arrangement 70 by mounting plate 110 having screw holes 114 with mechanical fasteners 89 to secure liner 75 to inlet 80.

With the skimmer assembly 72 retained in hole 74, the external adapter plate 84 may be mounted to the external surface of panel 76, for example, with fasteners or an adhesive. As noted above, in one aspect, external adapter plate 84 may be omitted.

According to another aspect of the invention, it is envisioned that the mounting arrangement 70 shown in FIGS. 6 and 7 may be installed by the following procedures. First, providing an insulated pool panel 90 having internal insulation 92 with a through hole 74, an internal side panel or side wall 94, and an external side panel or side wall 96 with a through hole 74. Mounting an internal adapter plate 86 having an internal cavity 87 and screw holes 88 to the internal side panel 94 about though hole 74. Then, inserting inlet passage 80 of skimmer assembly 72 into the through hole 74 in external side wall 96 and internal insulation 92 so that the face of the inlet passage 80 engages internal adapter plate 86. Then, securing the skimmer assembly 72 to internal adapter plate 86 with mechanical fasteners 89 passing through screw holes 88 and engaging holes in inlet passage 80 to retain the skimmer assembly 72 in hole 74. In one aspect, the fascia or reinforcing plate no having holes 114 and liner 75 may also be mounted on internal adapter plate 86 with fasteners, for example, with the same screws 89, if needed.

With the skimmer assembly 72 retained in hole 74 of insulated panel 90, the external adapter plate 84 may be mounted to the external surface of external side panel 96, for example, with fasteners or an adhesive. As noted above, external adapter plate 84 may be omitted.

Modifications or alterations to the above procedures or their sequence of implementation are also envisioned without detracting from the present invention.

It will be apparent from the foregoing that aspects of the present invention include mounting arrangements for pool skimmers, methods for mounting pool skimmers, pool skimmer adapter plates, and pool skimmer installation kits that provide unique opportunities to overcome the limitations of the prior art. For example, where prior art mounting arrangements and methods require the modification, replacement, or unique fabrication of pool panels or pools in order accommodate the varying designs of pool skimmer assemblies available on the market, aspects of the present invention may provide a single pool wall or panel having a single through hole that, regardless of the size and geometry of the skimmer assembly encountered, can be adapted to accommodate the numerous skimmer assemblies available to the pool designer and installer.

While aspects of the invention may be uniquely adapted for use with skimmers for swimming pools, for example, indoor or outdoor, in-ground, above-ground, or partially-above ground swimming pools, it is envisioned that aspects of the present invention may also be adapted for other bathing enclosures and other water-bearing enclosures, including but not limited to, spas, hot tubs, baths, tubs, showers, garden pools, fountains, water features, architectural pools, retention ponds, settling vessels, and the like.

While several aspects of the present invention have been described and depicted herein, alternative aspects may be effected by those skilled in the art to accomplish the same functions and benefits. Accordingly, it is intended by the appended claims to cover all such alternative aspects as fall within the true spirit and scope of the invention.

The invention claimed is:

1. A pool skimmer mounting arrangement for mounting a skimmer assembly on an insulated wall of a pool, the insulated wall having an internal side panel, an external side panel, and internal insulation, the mounting arrangement comprising:

a penetration in the internal side panel adapted to conform to an inlet of the skimmer assembly;

a penetration in the external side panel and a penetration in the internal insulation, the penetration in the external side panel and the penetration in the internal insulation each adapted to receive the inlet of the skimmer assembly and each having a width greater than a width of the penetration in the internal side panel;

a plurality of perforations about the penetration in the internal side panel; and a plurality of fasteners adapted to engage the plurality of perforations about the penetration in the internal side panel and engage a plurality of holes in the skimmer assembly to mount the skimmer assembly to the insulated pool wall.

2. The pool skimmer mounting arrangement as recited in claim 1, wherein the penetration in the internal side panel and the plurality of perforations about the penetration in the internal side panel are provided by an adapter plate having an internal cavity and a plurality of perforations about the adapter plate internal cavity, the adapter plate mounted over a penetration in the internal side panel of the insulated wall.

3. The pool skimmer mounting arrangement as recited in claim 2, wherein the internal cavity of the adapter plate is adapted to substantially completely align with the inlet of the skimmer assembly.

4. The pool skimmer mounting arrangement as recited in claim 1, wherein the plurality of holes in the skimmer assembly comprise a plurality of holes in the inlet of the skimmer assembly, and wherein each of the plurality of fasteners is adapted to engage one of the plurality of holes in the inlet of the skimmer assembly.

5. The pool skimmer mounting arrangement as recited in claim 4, wherein the plurality of holes in the inlet of the skimmer assembly comprise a plurality of holes in a face or a flange of the inlet assembly, and wherein each of the plurality of fasteners is adapted to engage one of the plurality of holes in the face or the flange of the inlet of the skimmer assembly.

6. The pool skimmer mounting arrangement as recited in claim 1, wherein the arrangement further comprises an external adapter plate adapted to mount over the penetration in the external side panel.

7. The pool skimmer mounting arrangement as recited in claim 6, wherein the external adapter plate comprises an internal cavity adapted to receive the inlet of the skimmer assembly.

8. The pool skimmer mounting arrangement as recited in claim 1, wherein the insulated wall comprises a thickness of at least 0.125 inches.

9. The pool skimmer mounting arrangement as recited in claim 8, wherein the pool wall thickness is at least 1 inch and at most 3 inches.

10. The pool skimmer mounting arrangement as recited in claim 1, wherein the arrangement further comprises at least one sealing device.

11. A method of installing a pool skimmer assembly on an insulated wall of a pool, the insulated wall having an internal side panel, an external side panel, and internal insulation, the method comprising:

providing a penetration in the internal side panel adapted to conform to an inlet of the skimmer assembly;

providing a plurality of perforations about the penetration in the internal side panel;

providing a penetration in the external side panel and a penetration in the internal insulation, the penetration in the external side panel and the penetration in the internal insulation each adapted to receive an inlet of the skimmer assembly and each having a width greater than a width of the internal cavity in the internal side panel of the insulated wall;

inserting the inlet of the skimmer assembly into the penetration in the external side panel and into the penetration in the internal insulation; and engaging a plurality of fasteners in the plurality of perforations in the internal side panel of the insulated wall and in a plurality of holes in the skimmer assembly to mount the skimmer assembly to the insulated pool wall.

12. The method as recited in claim 11, wherein inserting the inlet of the skimmer assembly into the penetration in the external side panel further comprises contacting the internal side panel of the insulated wall with the inlet.

13. The method as recited in claim 12, wherein providing the penetration in the internal side panel and providing the plurality of perforations about the internal cavity in the internal side panel comprises mounting an adapter plate having an internal cavity and a plurality of perforations about the internal cavity over a penetration in the internal side panel of the insulated wall.

14. The method as recited in claim 13, wherein mounting the adapter plate comprises mounting the adapter plate with an adhesive.

15. The method as recited in claim 11, wherein the method further comprises mounting an external adapter plate over the penetration in the external side panel.

16. The method as recited in claim 11, wherein the method further comprises providing at least one sealing device between the insulated wall and the inlet of the skimmer assembly.

17. A pool skimmer installation kit for mounting a skimmer assembly on an insulated wall of a pool, the insulated wall having an internal side panel, an external side panel, and internal insulation, the installation kit comprising:

a panel adapted to mount over a penetration through the insulated wall of the pool, the panel having an internal cavity adapted to conform to an inlet of the skimmer assembly and a plurality of perforations about the internal cavity adapted to receive fasteners adapted to engage a plurality of holes in the skimmer assembly; and a plurality of fasteners adapted to engage the plurality of perforations in the panel and the plurality of holes in the skimmer assembly to mount the skimmer assembly to the insulated pool wall.

18. The pool skimmer installation kit as recited in claim 17, wherein the plurality of holes in the skimmer assembly comprise a plurality of holes in a face or a flange of an inlet of the skimmer assembly.

19. The pool skimmer installation kit as recited in claim 17, wherein the kit further comprises at least one sealing device.

20. The pool skimmer installation kit as recited in claim 17, wherein the kit further comprises installation instructions.

* * * * *